This invention relates generally to dry cleaning apparatus and more particularly relates to solvent circuitry incorporating dual filtering tanks which also serve as sludge cookers.

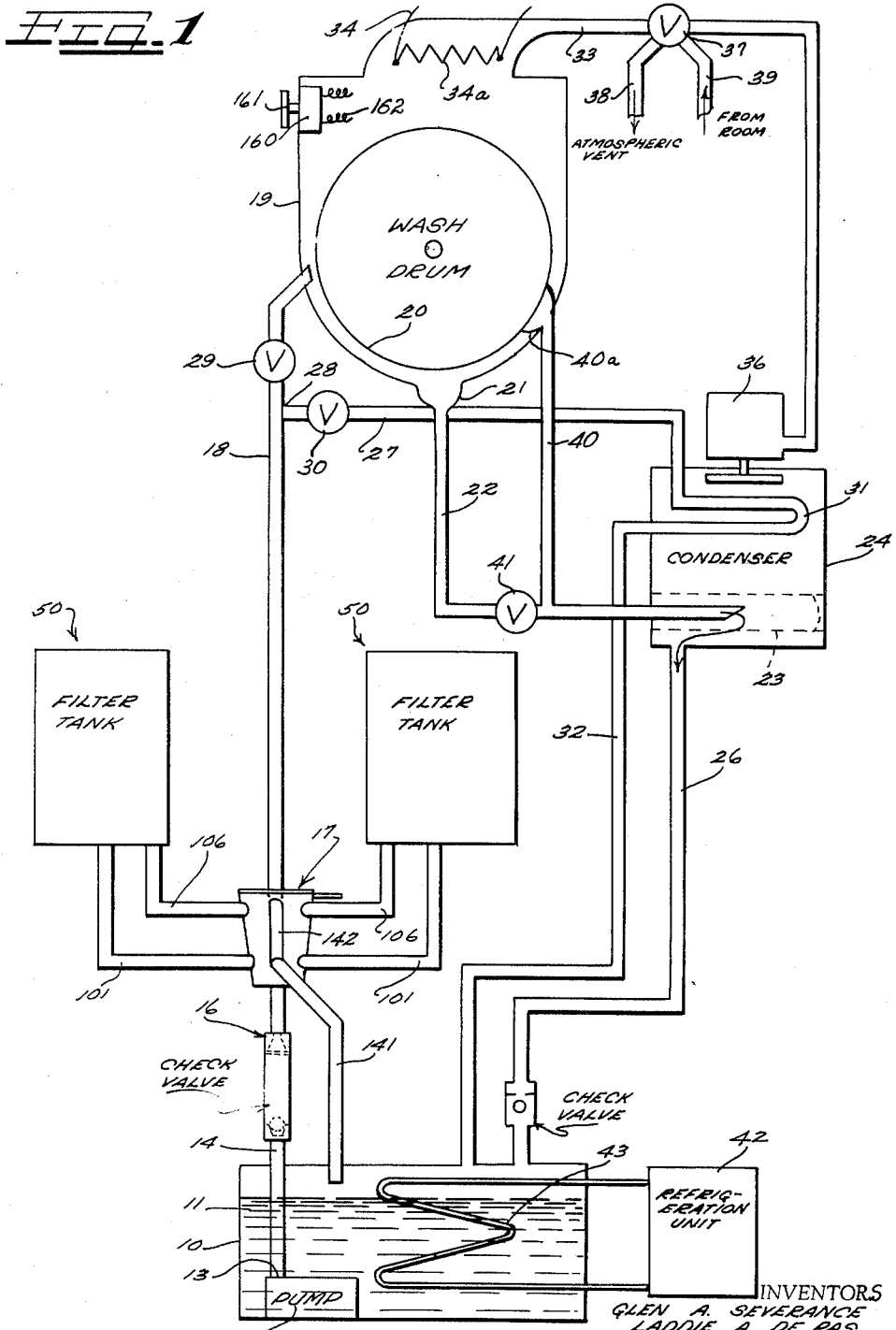

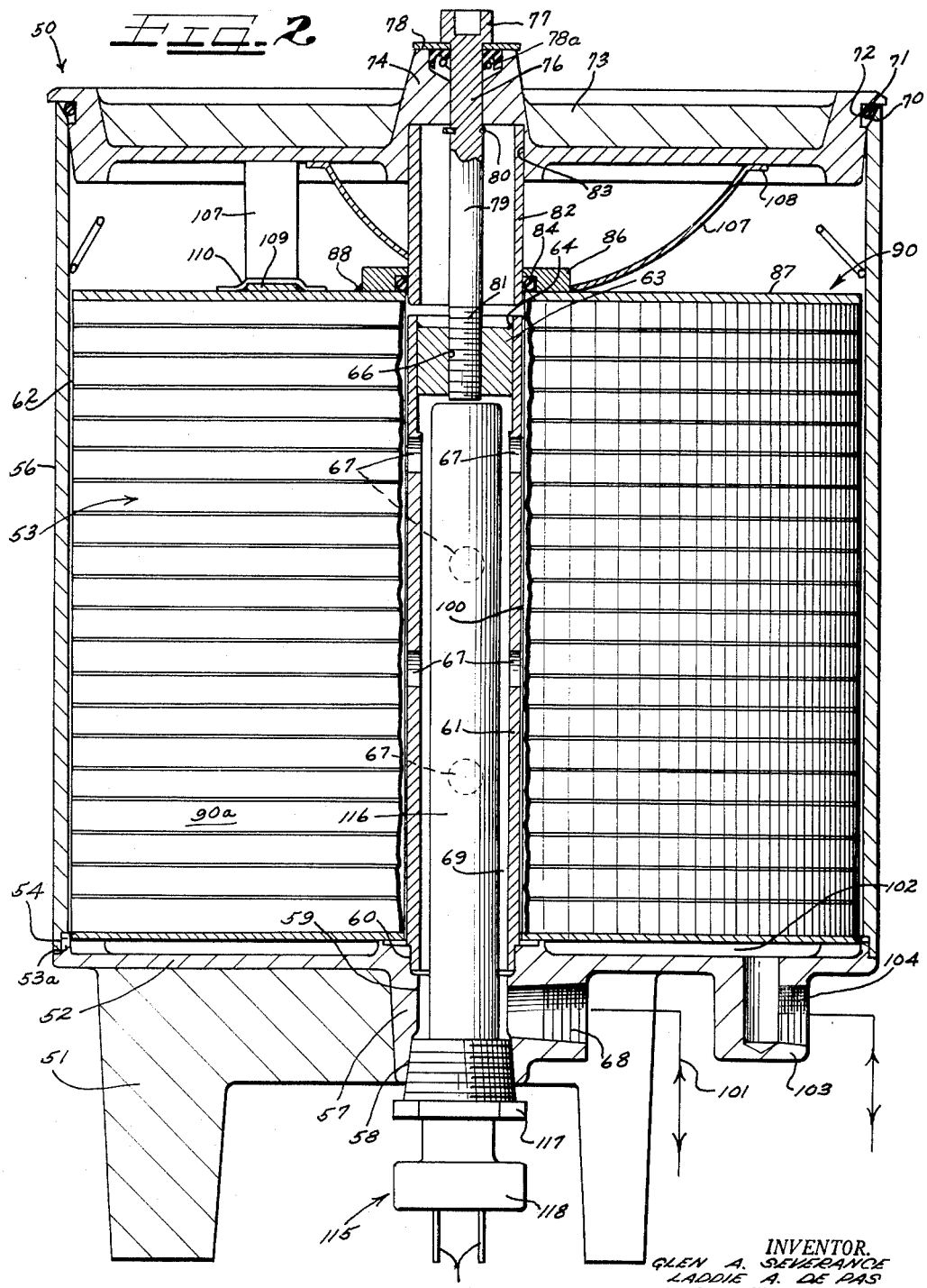

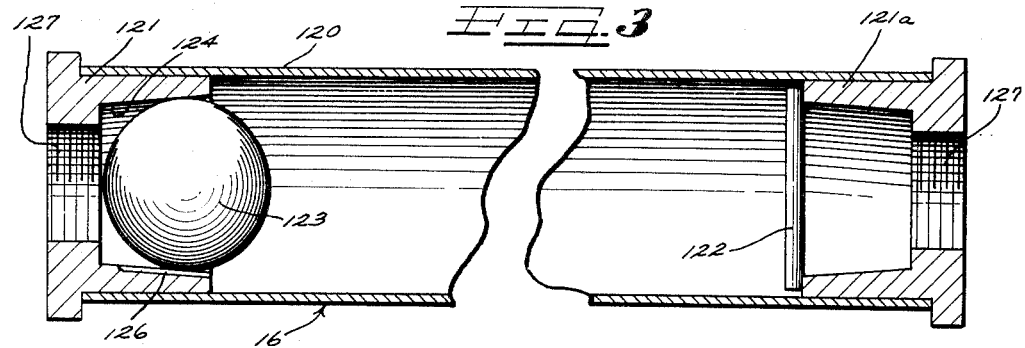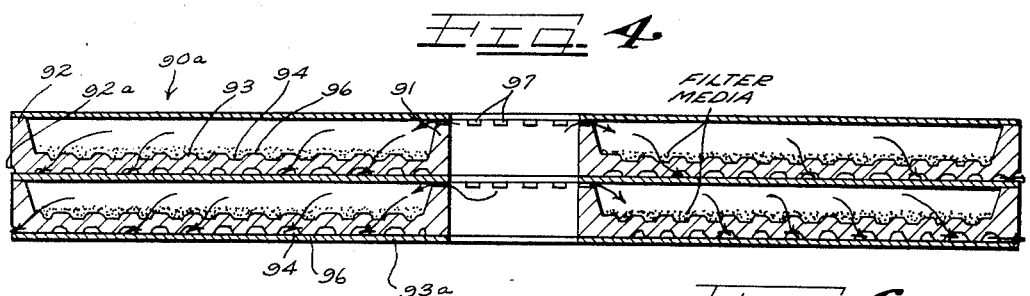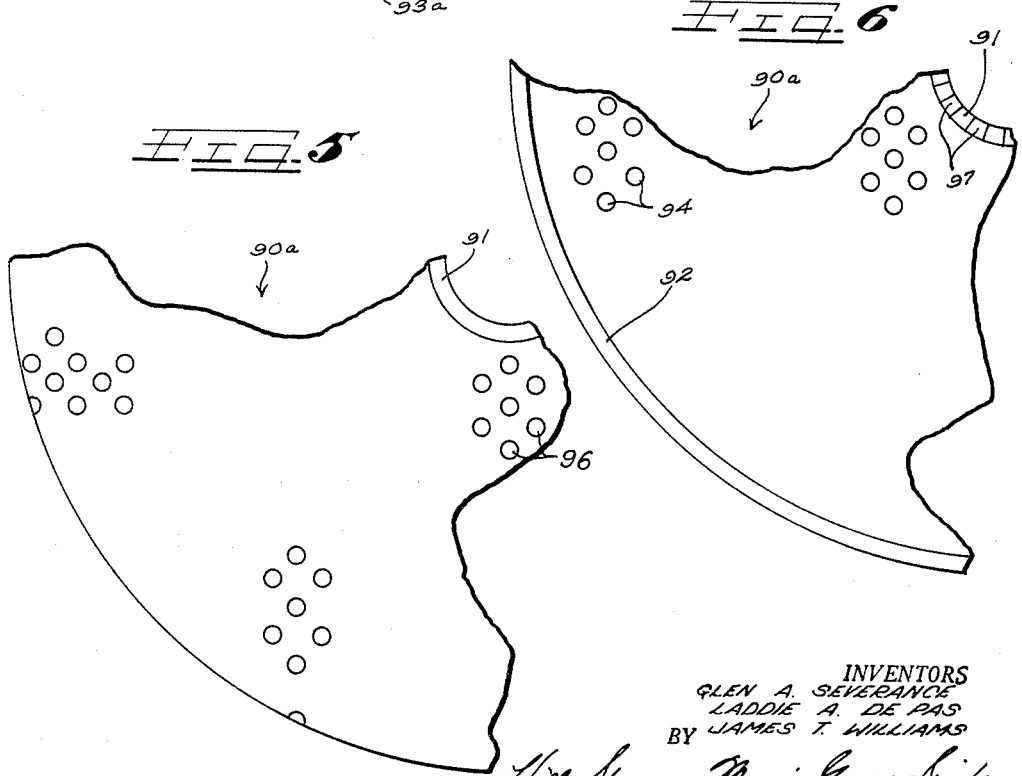

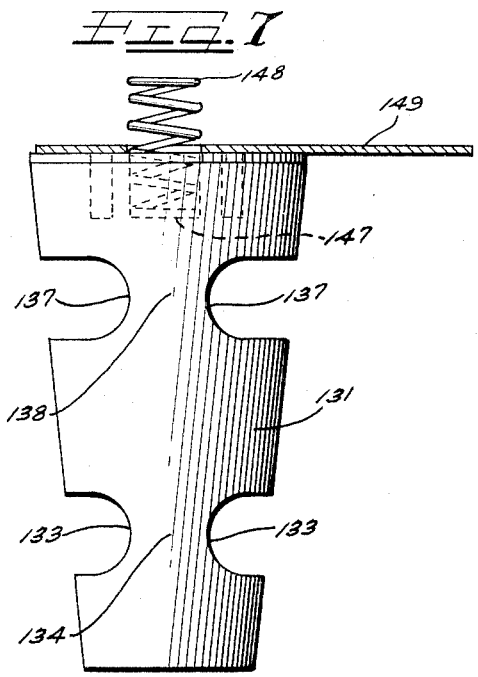
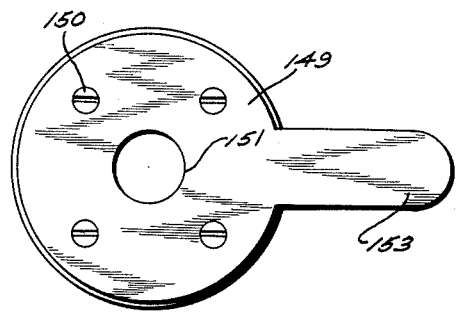
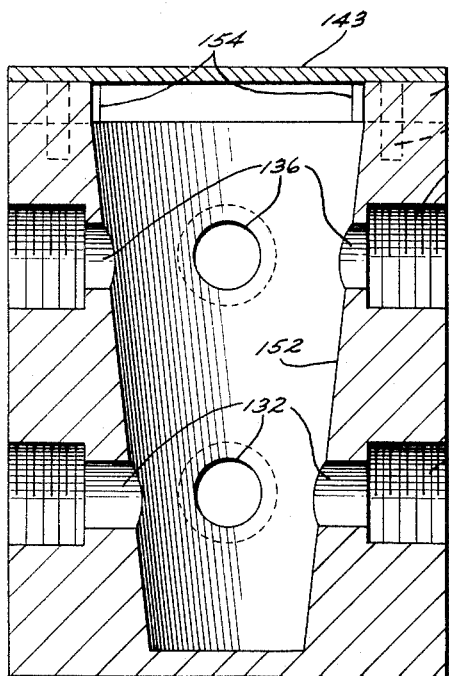
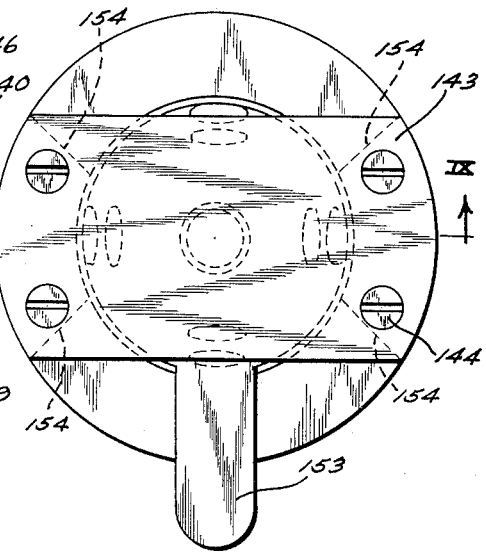
INVENTORS
GLEN A. SEVERANCE
LADDIE A. DE PAS
JAMES T. WILLIAMS
BY
ATTORNEYS 3,232,081
DRY CLEANING APPARATUS
Glen R. Severance, Benton Harbor, Laddie A. De Pas, Sodus, and James T. Williams, St. Joseph, Mich., assignors to Whirlpool Corporation, St. Joseph, Mich., a corporation of Delaware
Filed Nov. 2, 1961, Ser. No. 149,575
8 Claims. (Cl. 68—18)

In the art of so-called "dry" cleaning, solvents are used rather than ordinary liquids to remove the dirt. In the early stages of the art, flammable fluids such as naphtha or gasoline were employed, however, through the developments of chemistry, safer and more effective cleaning solvents have been discovered. For example, one cleaning solvent which has been found to be effective is perchloroethylene.

Because the cost of safe and effective cleaning solvents indicates the necessity of conservation, it has been contemplated heretofore to take the filter media after use, which is called sludge, and cook the same in a special sludge cooker for the purpose of extracting the costly solvent before discarding the filter media.

In accordance with the principles of the present invention, a dry cleaner apparatus is operated by alternately and selectively directing a stream of contaminated liquid solvent or transferring thermal energy into a dead ended passage whereupon the contaminated solvent is diffused outwardly of the passage through a filter mass for recycling of the filtered solvent to the dry cleaner. Upon radiating heat outwardly of the passage, the solvent may be selectively cooked out of the filter mass, thereby facilitating repalcement of the filter mass with a fresh filter cartridge. The cost of the filter media is therefore reduced and service costs are minimized.

More specifically, dual filtering tanks are provided which serve also as sludge cookers, the tanks being filled with disposable filter cartridges which may be conveniently replaced in the same manner as an oil filter in an automobile engine. An immersion-type heater is contained within the tank and is used for generating thermal energy to cook the solvent out of the filter mass. Thus, by providing dual filtering tanks so characterized, a double four-way valve may be employed in association with appropriate conduit means to selectively direct the solvent in a closed hydraulic solvent circuit between a reservoir tank and the wash drum and for filtering flow through an appropriate filter tank.

It is an object of the present invention to provide a dry cleaner apparatus wherein contaminated liquid solvent or radiated thermal energy may be diffused or transferred outwardly of a confined passage through a filter mass, thereby either to recycle filtered solvent to the dry cleaner or for cooking out the solvent from the filter mass.

Another object of the present invention is to provide a filter tank which develops the additional function of a sludge cooker.

A still further object of the present invention is to provide an improved filtering apparatus for a dry cleaner having disposable filter cartridges.

Yet another object of the present invention is to provide a filtering system for a dry cleaner wherein dual filter cookers are provided so that one unit can continue to filter solvent while the other unit cooks out solvent from the filter media, thereby to facilitate replacement of the filter media.

Yet another object of the present invention is to provide a hydraulic circuit for a dry cleaner having dual filtering units and utilizing a double four-way valve for controlling the flow of solvent in the circuit.

Many other advantages, features and additional objects of the present invention will become manifest to those versed in the art upon making reference to the detailed description which follows and the accompanying sheets of drawings in which a preferred structural embodiment of a filtering apparatus incorporating the principles of the present invention.

On the drawings:

FIGURE 1 is a somewhat schematic plumbing diagram showing a dry cleaner apparatus incorporating the principles of the present invention.

FIGURE 2 is a cross-sectional view illustrating details of construction of a dual filter-cooker unit provided in accordance with the principles of the present invention.

FIGURE 3 is a cross-sectional view of a floating check valve incorporated in the hydraulic circuitry of FIGURE 1.

FIGURE 4 is a fragmentary cross-sectional view illustrating additional details of construction of the stacked elements which make up the replaceable filter cartridge utilized in the dual filter-cooker of FIGURE 2.

FIGURE 5 is a fragmentary bottom plan view of one of the filter elements which make up the filter cartridge units.

FIGURE 6 is a top plan view similar to FIGURE 5.

FIGURE 7 is a side elevational view of the valve plug in the four-way valve of the present invention.

FIGURE 8 is a top plan view of the valve plug of FIGURE 7.

FIGURE 9 is a cross-sectional view of the valve body in which the valve plug of FIGURES 7 and 8 is received; and FIGURE 10 is a plan elevational view of the valve body of FIGURE 9.

As shown on the drawings:

Referring first of all to FIGURE 1 the dry cleaning apparatus of the present invention utilizes a closed hydraulic circuit through which a cleaning solvent such as perchloroethylene is circulated. Thus, there is shown a reservoir 10 charged with a supply of cleaning solvent indicated at 11. A pump 12 having an inlet communicating with the interior of the reservoir 10 drives a supply of solvent 11 through an outlet 13 in the form of a stream carried by a discharge conduit 14.

The stream carried by the conduit 14 passes through a floating check valve shown generally at 16 and is then directed to a four-way double valve shown generally at 17.

Filtered solvent is directed through a conduit 18 leading to means forming a treatment zone, for example, a tub 19 in which is contained washing means such as drum 20 rotatably driven on a generally horizontal axis. The tub 19 has a sump 21 in which the solvent is collected and is returned via a conduit 22 through a filter 23 in the lower part of a condenser housing 24 and from thence through a conduit 26 back to the reservoir 10. A valve 41 is provided to selectively control the flow of solvent through conduit 22.

A by-pass conduit 27 is connected to the conduit 18 as at 28. A valve 29 in this conduit 18 and a valve 30 in the conduit 27 may be adjusted so that cleaning solvent can be by-passed around the treatment zone directly through the conduit 27, through condenser coils 31 in the condenser housing 24 and back to the reservoir 10 via a conduit 32.

A nozzle 40a picks up liquid solvent and solvent vapors from the clothes load in drum 20 by a vacuum created at nozzle 40a by the operation of motor fan unit 36 during the extraction and dry portions of the machine cycle. The liquid solvent and solvent vapors pass from conduit 40 into a lint filter which is located in the lower portion of condenser housing 24. The solvent vapors are directed across condenser coils 31 by motor fan unit 36 whereupon the vapors will be converted to liquid solvent which will be returned to reservoir 10, along with the liquid solvent from conduit 40, via the conduit 26.

The vapor stripped air is then recirculated by motor fan unit 36 through an air duct 33 to the wash drum 20. During the extraction portion of the machine cycle heater 34a is de-energized. However, during the dry portion of the cycle heater 34a is energized, imparting thermal energy to the passing air stream which ultimately comes in contact with the clothes load in drum 20 to cause the solvent in the clothes to readily vaporize. A valve 37 in air duct 33 has connections to an atmospheric vent 38 and to a room air duct 39 which are used during the deodorizing cycle to vent wash drum 20 for a predetermined period of time at the end of a machine cycle.

In order to keep the cleaning solvent at an optimum temperature, a refrigeration unit 42 may be provided having cooling coils 43 in the reservoir 10 thereby to maintain the solvent 11 at an optimum temperature for best cleaning results.

In accordance with the principles of the present invention, two dual filter-cookers are provided each of which is shown generally at 50, the details of only one of which need be described. Referring now to FIGURE 2, it will be noted that the dual filter-cooker 50 comprises a base member 51 having a horizontally extending wall 52 which forms the lower wall of a filter chamber 53. The wall 52 has an upstanding peripheral flange 53a notched as at 54 thereby to receive in fitted relation a generally cylindrical outer wall 56.

At its radially innermost portion, the wall 52 terminates in a boss 57 formed with a threaded aperture 58 and having an opening 59 which is counterbored as at 60 thereby to form a notch for receiving and seating an inner wall 61 formed by a generally tubular element which extends upwardly from the boss 57 and which is spaced concentrically inwardly of the outer wall 56. The inner wall 61 and the outer wall 56 prescribe the inner and outer limits of the annular filter chamber 53.

At the upper end of the tube 61 there is provided a nut 63 secured in firm assembly by fastening means such as weldment 64 having a threaded aperture 66 formed therein.

Along the length of the inner wall 61 there is formed a plurality of longitudinally spaced openings 67. The boss 57 is also formed with a threaded opening 68 which communicates with the interior of the inner wall 61. The inner wall 61 is, effect, a hollow sleeve which forms a blind ended passage 69.

At the upper end of the outer wall 56, a beveled portion 70 is formed which is engaged by a sealing member 71 confined within an annular peripheral recess 72 formed in a cover 73 which overlies the inner and outer walls 61 and 56.

The cover has a center boss 74 through which passes a bolt 76 having a head portion 77 overlying a retainer disk 78. The bolt 76 has a smooth shank portion 79 engaged by a snap ring 80 on the inside of the boss 74 and further includes a threaded portion 81 which engages the threaded aperture 66, thereby permitting the cover 73 to be drawn up in firm assembly with the outer wall 56. Also, a seal 78a engages the smooth shank portion 79 thereby preventing leakage of solvent from around the bolt 76. A sleeve 82 is received within a recess 83 formed in the boss 74. The outer peripheral surface of the sleeve 82 is engaged by a sealing member 84 carried within a retainer ring 86 and fastened to a pressure plate 87 as at 88.

Disposed within the filter chamber are a plurality of replaceable filter cartridge members or elements 90a in stacked relationship to comprise a disposable filter cartridge shown generally at 90. The filter cartridge elements 90a are shown in greater detail in FIGURES 4, 5 and 6. Thus it will be noted each filter cartridge member 90a comprises an annular member having an inner rim 91 and an outer rim 92 and an embossed body portion 93. Also, filter cartridge member 90a has at its upper peripheral edge a non-porous, non-solvent wetting divider member 93a. The filter member 90a is preferably made of a porous material such as paper and is embossed to form alternate depressions 94 and embossments 96 to maintain porosity and provide a flow path from between the underneath surface of the body portion 93 and the non-porous divided member 93a to the outside of the body portion 93 at 92a. The cup-shaped area between the inner and outer rims 91 and 92 can be utilized to confine a layer of filter media such as diatomaceous earth and activated carbon or similar materials.

The upper edge of the inner rim 91 is particularly characterized by a plurality of circumferentially spaced grooves or slots 97 forming flow passages into the cup-shaped area containing the filter media.

As shown in FIGURE 2, the inner rim 91 of each disposable filter cartridge element 90a is spaced from the adjoining inner wall 61, thereby to form a limited annular space or chamber 100.

The threaded opening 68 is connected by means of a conduit 101 to the corresponding openings of the four-way valve 17. Thus, contaminated solvent pumped by the pump 12 will be directed through the conduit 101 and into the passage 69 whereupon the contaminated solvent will be diffused outwardly of the passage 69 through the openings 67 and into the chamber 100.

The solvent then flows through the passages 97 and into the filter elements 90a which make up the disposable filter cartridges 90. The solvent then passes through the filter media, through the porous paper material of the filter elements and into the filter chamber 62 which is left by the clearance space between the outer wall 56 and the outer rims 92 of the filter elements.

The filtered solvent is collected in a collecting recess 102 formed by the bottom wall 52 and a boss 103 having a threaded passage 104 may be connected to a conduit 106 for returning the filtered solvent into the hydraulic circuit via the four-way valve 17.

The pressure plate 87 engages against the uppermost disposable filter cartridge element 90a in the stack. In order to provide a continuous biasing force against the stack, a plurality of leaf springs are provided each being shown at 107. Each leaf spring 107 has a flange 108 engaging against the cover 73 and a flange 109 which is received in a retainer 110 carried on the pressure plate 87. The springs 107 provide enough biasing force on the filter elements to completely seal the outer peripheral edges of the filter elements 90a or to control leakage around these outer peripheral edges. By allowing a minute by-pass of solvent from around these peripheral edges, a beneficial effect is created without detrimentally affecting efficient filtering action.

More specifically, leaf springs 107 provide a force of approximately 800 pounds downwardly on the pressure plate 87 and filter cartridge 90. This force is sufficient to completely seal the upper outer peripheral edges 92 of the superposed filter elements 90a with the bottom surface of divider member 93a when a differential pressure of 10 p.s.i. is present across the filter cartridge. When the differential pressure is in excess of 10 p.s.i., the leaf springs 107 are forced upwardly allowing the outer peripheral edges of the superposed filter elements 90a to part only slightly from the underneath surface of the divider member 93a and to allow a minute by-pass of solvent from around these peripheral edges. Because of the number of filter elements 90a the minute by-pass of solvent around the outer peripheral edges of filter elements 90a will extend over a minute slit of length $D \times \pi \times N-1$, where $D=$outer diameter of filter elements, $\pi=3.14$ and $N=$number of filter elements. Thus, during the by-passing of solvent, a considerable degree of filtering occurs with an increase in filter life. It has been found that by-passing 30–40% of the solvent around the peripheral edges of the filter elements does not cause a serious detrimental effect on efficient filtering action.

In order to adapt the tank 50 for the dual function of cooking as well as filtering, an immersion-type heating unit shown generally at 115 is provided. The heating unit includes an elongated heating element 116 which extends upwardly into the passage 69 terminating adjacent the nut 63. At one end there is fastened to the heating unit 116 a threaded fastener 117 which engages with the threaded aperture 58 and permits the heating unit to be fastened in firm assembly with the boss 57. A plug 118 having electrical contacts 119. permits the heating unit to be connected to a source of electrical power. When energized, thermal energy will be radiated outwardly through the openings 67 and through the inner wall 61 into filter chamber 53 to cook out solvent from the filter media and the filter elements. Since a negligible amount of convection is present in filter tank 50 during cook out, the solvent vapors expand sufficiently to push themselves from the filter chamber 53 through conduits 101 and 106 to valve 17. Because of the relatively cooler temperatures of conduits 101 and 106, valve 17 and drain conduits 141 and 142 with respect to the filter chamber 53, the solvent vapors condense when they come in contact with the walls of these members and drain to the reservoir 10. The valve 17 is kept relatively cool by cool solvent flowing from reservoir 10 during the filtering cycles of the opposite filter. However, natural convection of air over the outside of conduits 101 and 106, valve 17 and drain conduits 141 and 142 is sufficient coolant for condensing the relatively warmer solvent vapors.

In addition to the immersion-type heating unit 115, a second type heating unit may be used. One or a plurality of wrap-around heating elements may be placed on the outer surface of outer wall 56. When the latter-mentioned heating elements are energized, thermal energy is transferred into chamber 53 thereby cooking the solvent out of the filter cartridge 90 and the filter media.

Referring now to FIGURE 3 in connection with FIGURE 1, the details of the floating check valve are shown. The floating check valve 16 includes a sleeve 120 receiving at each end a flanged plug 121 and 121a. The plug 121a has associated therewith a small diameter rod or bar 122 while at the other end there is shown a ball 123 having a specific gravity such that the ball 123 will float in a supply of solvent. Thus, the ball 123 will engage against the rod or bar 122, thereby allowing unrestricted flow of solvent to the four-way valve 17.

When the valve 17 is operated so that solvent flows through the filter tank 50 in an opposite direction or when the operation of the pump is terminated at the end of each filtering cycle, the ball 123 will drop to a sealing position so that there is a short rapid flow. The valve seat 124 formed by the tapered walls of the flange plug 121 is relieved as at 126, thereby to permit a continuing limited flow. The relief 126 constitutes a bleeding groove to allow each filter 50 to completely drain to the reservoir 10. Thus, the floating check valve 16 allows a rapid drain from the inside of the filter tank 50 when the valve 17 is actuated so as to reverse flow in the filter or at the termination of each filtering cycle when the operation of pump 12 has been discontinued. The rapid drain tends to disturb the filter bed or filter mass which seems to be desirable in breaking the skin of dirt which apparently forms during the filter operation. However, the main filter mass is substantially undisturbed. Accordingly, an improved filtering action is thus afforded.

It will be noted that each plug 121 and 121a has a threaded aperture 127 formed therein by means of which the floating check valve may be connected in line within the conduit 14.

The valve 17 comprises a rotary valve having a valve body 130 and a valve plug 131. The valve 17 is a rotary four-way double valve with a tapered plug. Thus, the valve body has four pairs of two openings spaced at 90° angles to the center of each pair. Each set of four openings is located on one level. The tapered plug is provided with pairs of peripheral grooves at corresponding levels, thereby providing alternate grooves and lands for controlling the flow of fluid through the openings.

To more clearly identify such openings, it will be noted that a first set of four lower openings is formed in the valve body 130 at 132, the corresponding set of grooves or recesses being formed in the valve core 131 as shown at 133, thereby leaving alternate recesses 133 and land areas 134.

The valve body 130 has a second upper set of four openings 136 while the corresponding grooves or recesses in the valve core 131 are shown at 137 and the land areas are shown at 138.

Each of the openings 132 has a threaded portion 139 to facilitate connection to an appropriate conduit while each opening 136 has a threaded portion 140 for the same purpose. Thus, the first set of openings 132 are connected to the conduits 101, 14, 101 and a drain conduit 141 returning to the reservoir 10. The upper set of openings is connected to the conduits 106, 18, 106 and to the drain conduit 141 through drain conduit 142.

The valve construction 130, 131 is a tapered plug-type valve and the tapered plug 131 is adapted to be spring loaded thereby to seal the top openings from the bottom openings and the mating pair of openings from the opposite pair of mating openings. In this regard, a retaining bar 143 is fastened in firm assembly with a plurality of fasteners 144 received in the top of the valve body 130 as at 146.

The top of the valve plug 131 is recessed as at 147 and bottoms a continuous biasing means such as a coil spring 148. A handle actuator 149 is connected to the top of the valve plug 131 by a plurality of fasteners 150 and the actuator 149 has a central aperture 151 formed therein through which the coil spring 148 extends for engagement against the retainer bar 143. Thus, the valve plug 131 is biased into a tapered recess 152 formed in the valve body 130 and intersecting the various openings 136 and 132. The configuration of the plug 131, of course, is such as to be complementary to the tapered recess 152 and the spacing relation between the grooves or recesses 133 and 137 is arranged to locate the respective recesses and lands 133, 134, 137, and 138 in controlling registry with the spaced-apart openings 132 and 136 in a valving relation.

The actuator 149 has a handle 153 which extends outwardly of the valve body 130 through a recess 154, thereby to facilitate rotary or angular shifting of the valve plug 131 in the valve body 130.

It will be understood, of course, that the entire dry cleaning apparatus of FIGURE 1 can include suitable control means such as a sequential control shown generally at 160 and including presettable regulator means shown diagrammatically at 161, thereby to automatically operate all of the components of the apparatus through a programed schedule of cleaning operations. In this connection, the sequential control means 160 controls electric circuitry shown diagrammatically at 162 and which will be associated with the movable components such as motor actuators for the pump 12, the valve 17, the refrigerator unit 42, the motor fan unit 36, the valves 29, 30, 37 and 41 and actuating means associated with the wash drum 20. Heater 34a will also be actuated by control means 160.

Briefly reviewed, in operation the pump 12 drives a stream of solvent 11 from the reservoir 10 through the valve 17 whereupon one of the filter units 50 is utilized as a filter while the other of the filter units 50 is cooking out solvent from the filter media. Thus, the filter tank used as a filter has the solvent passing through the conduit 101 and into the opening 68 whereupon the solvent passes upwardly into the passage 69 outwardly through the openings 67 and into the chamber 100. The solvent then enters the disposable filter cartridges 90 through the passages 91 and filtered solvent is collected via the collecting passage 102 and returned to the hydraulic circuit through the opening 104 to the conduit 106 and via the valve 17 to the conduit 18 for return to the wash drum 20.

Since the dual filter-cooker 50 is adapted to have either a stream of liquid solvent directed therethrough or thermal energy radiated therefrom, it will be understood that when used as a cooker the heating element 116 will be energized whereupon the thermal energy will be radiated outwardly of the passage 69 through the openings 67 and inner wall 61 and into the filter elements 90a thereby to cook out solvent.

The disposable filter cartridges 90 will operate efficiently for plural machine cycles before new cartridges are required. It has been noted in practice, for example, that 20 to 30 machine cycles may be effected before a new cartridge 90 must be inserted into the filter chamber. At the end of a determined number of cycles, the heating element 116 will commence operation and is controlled by a built-in thermostat which can be housed within the plug 118.

The floating check valve 16 allows a rapid drain from the inside of the filter tank 50 when the double four-way valve 17 is actuated so as to reverse flow in the filter or at the termination of each filtering cycle when the operation of pump 12 has been discontinued. The rapid drain tends to disturb the filter bed and breaks the skin of dirt formed on the filter media without substantially disturbing the filter mass. The floating check valve permits a short rapid flow with a continuing limited flow, thereby to completely drain the filter chamber to the reservoir 10. It is contemplated that regulating means will be provided so after any dual filter-cooker 50 has been cycled through a predetermined number of cycles, the valve 17 will be rotated 90° either automatically or manually whereupon the filtering operation will be shifted to the other unit.

Although minor modifications might be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. In a dry cleaning apparatus having a closed hydraulic circuit for cleaning solvent, a filter tank comprising inner and outer concentrically disposed walls together forming an annular filter chamber, said inner wall having a passage extending through the interior thereof adapted to receive contaminated cleaning solvent from the hydraulic circuit and having spaced-apart openings formed therein communicating said passage with the interior of said filter chamber, a plurality of filter elements in stacked relationship in said filter chamber each filter element comprising an annular disk-shaped cartridge member made of porous material and having inner and outer upstanding rims forming a cup-shaped space, a layer of loose filter media such as diatomaceous earth confined in the cup-shaped space between the rims, said inner rim having its upper surface fluted to form plural passages admitting cleaning solvent from said passage into said cup-shaped space between adjoining layers of cartridge members and the loose filter media confined therein, the outer rims of said cartridge members being spaced from the adjoining outer wall of said tank to form a chamber receiving filtered solvent, heating means in said passage for selectively cooking out recoverable solvent from the filter elements and means forming a collection passage at the bottom of said chamber for returning the filtered solvent to the hydraulic circuit.

2. In a dry cleaner as defined in claim 1, said heating means comprising an immersion-type electrically energized heating element secured in firm assembly in said passage.

3. In a dry cleaner as defined in claim 1, conduit means connected to said inlet of said passage, and a floating check valve in said conduit means for effecting rapid evacuation of said passage, thereby reversely flowing solvent through said loose filter mass to break up any skin or dirt thereon.

4. In a dry cleaning apparatus as defined in claim 1 further characterized by divider elements alternately positioned between said filter elements and engaging said filter elements in a contiguous relationship, said filter elements having marginal walls respectively cooperating with said divider elements to define a plurality of filter cavities, means providing access into said cavities and exit therefrom toward one of said openings, means biasing said filter elements and said divider elements toward each other to normally seal said divider elements respectively against said marginal walls and yieldable under predetermined fluid pressure exerted from within said cavities to effect a minute separation of said divider elements from said filter elements to automatically provide a pressure relief by-pass exit between said marginal walls and said divider elements at pressures exceeding said predetermined pressure.

5. In a dry cleaning apparatus having a closed hydraulic circuit for cleaning solvent, a filter tank comprising inner and outer concentrically disposed walls together forming an annular filter chamber, said inner wall having a passage extending through the interior thereof adapted to receive contaminated cleaning solvent from the hydraulic circuit and having spaced-apart openings formed therein communicating said passage with the interior of said filter chamber, a plurality of filter elements in stacked relationship in said filter chamber each filter element comprising an annular disk-shaped cartridge member made of porous material and having inner and outer upstanding rims forming a cup-shaped space, a layer of loose filter media such as diatomaceous earth confined in said cup-shaped space between said rims, said inner rim having its upper surface fluted to form plural passages admitting cleaning solvent from said passage into said cup-shaped space between adjoining cartridge members and the loose filter media contained therein, the outer rims of said cartridge members being spaced from the adjoining outer wall of said tank to form a chamber receiving filter solvent, heating means in said passage for selectively cooking out recoverable solvent from the filter elements, means forming a collection passage at the bottom of said chamber for receiving and returning the filter solvent to the hydraulic circuit, a cover overlying said inner and outer walls and carried by said outer wall, a pressure plate in said filter chamber engaging the uppermost filter cartridge member, and a continuous biasing means between said cover and said pressure plate to bias the filter cartridge members together.

6. In a dry cleaning apparatus having a closed hydraulic circuit for cleaning solvent, a filter tank comprising inner and outer concentrically disposed walls together forming an annular filter chamber, said inner wall having a passage extending through the interior thereof adapted to receive contaminated cleaning solvent from the hydraulic circuit and having spaced-apart openings formed therein communicating said passage with the interior of said filter chamber, a plurality of filter elements in stacked relationship in said filter chamber each filter element comprising an annular disk-shaped cartridge member made of porous material and having inner and outer upstanding rims forming a cup-shaped space, a layer of loose filter media such as diatomaceous earth confined in said cup-shaped space between said rims, said inner rim having its upper surface fluted to form plural passages admitting cleaning solvent from said passage into said cup-shaped space between adjoining layers of cartridge members, the outer rims of said cartridge members being spaced from the adjoining outer wall of said tank to form a chamber receiving filtered solvent, heating means in said passage to cook out recoverable solvent from the filter elements and means forming a collection passage at the bottom of said chamber for returning the filtered solvent to the hydraulic circuit, a threaded plug in an upper portion of said passage, a cover overlying said inner and outer walls and carried by said outer wall, a fastening screw engaging said plug and retaining said cover in firm assembly with said tank, a pressure plate in said filter chamber engaging the uppermost filter cartridge member, and a continuous biasing means between said cover and said pressure plate to bias the filter cartridge members together.

7. In a dry cleaning apparatus, a solvent reservoir, a pump having an inlet communicating with said reservoir and an outlet through which solvent is discharged, conduit means connected to said outlet, a four-way double rotary valve in said conduit means to direct the flow of solvent, two separate filter tanks each comprising inner and outer concentrically disposed walls together forming an annular filter chamber, said inner wall having a first passage extending through the interior thereof adapted to receive contaminated cleaning solvent and having spaced apart openings formed therein communicating said first passage with the interior of said filter chamber, a plurality of filter elements in stacked relationship in said filter chamber each filter element comprising an annular disk-shaped cartridge member made of porous material and having inner and outer upstanding rims forming a cup-shaped space, a layer of loose filter media confined in the cup-shaped space between the rims, said inner rim having its upper surface fluted to form plural passages admitting cleaning solvent from said first passage into said cup-shaped space between adjoining layers of cartridge members and the loose filter media confined therein, the outer rims of said cartridge members being spaced from the adjoining outer wall of said tank to form a chamber receiving filtered solvent, and means forming a collection passage at the bottom of each said chamber for returning the filtered solvent to the reservoir, first conduit means connected between said valve and each said filter tank to communicate contaminated cleaning solvent to said first passage of each respective filter tank, second conduit means connected between said valve and each said collection passage of said filter tank, and a drain conduit from said valve to said reservoir for returning filtered solvent to the reservoir, means forming a treatment zone for treating a batch of materials to be dry cleaned and receiving filtered solvent from said tanks, and means for recycling solvent from said treatment means to said reservoir, whereby operation of said four-way double rotary valve will selectively activate only one of said filter tanks while the other filter tank is made available for cooking out and servicing.

8. In a dry cleaning apparatus, a solvent reservoir, a pump having an inlet communicating with said reservoir and an outlet through which solvent is discharged, conduit means connected to said outlet, a four-way double rotary valve in said conduit means to direct the flow of solvent, said four-way valve having a valve body and a spring-loaded rotary tapered plug in said valve body, said valve body having two sets of two pairs of openings spaced at 90° to the center of each pair and said plug having two sets of two grooves and two lands for controlling the flow of liquid through said valve, and continuous biasing means for loading the plug axially and sealing the separate sets of openings and the mated openings from one another, two separate filter tanks each comprising inner and outer concentrically disposed walls together forming an annular filter chamber, said inner wall having a first passage extending through the interior thereof adapted to receive contaminated cleaning solvent and having spaced apart openings formed therein communicating said first passage with the interior of said filter chamber, a plurality of filter elements in stacked relationship in said filter chamber, each filter element comprising an annular disk-shaped cartridge member made of porous material and having inner and outer upstanding rims forming a cup-shaped space, a layer of loose filter media confined in the cup-shaped space between the rims, said inner rim having its upper surface fluted to form plural passages admitting cleaning solvent from said first passage into said cup-shaped space, the outer rims of said cartridge members being spaced from the adjoining outer wall of said tank to form a chamber receiving filtered solvent, and means forming a collection passage at the bottom of said chamber for returning the filtered solvent, first conduit means connected between one said set of openings to communicate contaminated cleaning solvent to said first passage of each respective filter tank, second conduit means connected between said mated openings of said valve and each said collection passage of said filter tanks and a drain conduit from said valve to said reservoir, means forming a treatment zone for treating a batch of materials to be dry cleaned and receiving filtered solvent from said tanks, and means for recycling solvent from said treatment means to said reservoir, whereby operation of said four-way double rotary valve will selectively activate only one of said filter tanks while the other filter tank is made available for servicing.

References Cited by the Examiner

UNITED STATES PATENTS

| | | | |
|---|---|---|---|
| 564,657 | 7/1896 | Stiebel | 210—184 |
| 691,395 | 1/1902 | Logue et al. | 137—192 |
| 825,507 | 7/1906 | Bayley | 210—340 X |
| 2,301,803 | 11/1942 | Davis | 210—167 X |
| 2,309,137 | 1/1943 | Peterkin | 137—625.19 X |
| 2,575,995 | 11/1951 | Briggs et al. | 210—492 X |
| 2,583,963 | 1/1952 | O'Meare | 210—344 |
| 2,836,045 | 5/1958 | Smith | 210—167 X |
| 2,862,622 | 12/1958 | Kircher et al. | 210—411 X |
| 2,902,164 | 9/1959 | Kornauf | 210—347 X |

FOREIGN PATENTS 711,076   6/1954   Great Britain.

REUBEN FRIEDMAN, *Primary Examiner.*

HERBERT L. MARTIN, *Examiner.*